United States Patent Office 3,579,295
Patented May 18, 1971

3,579,295
PROCESS FOR ATTACK OF BAUXITE WITH ALKALINE SOLUTION
Louis Tamisé, Douvres-la-Delivrande, and Jacques Millet, Versailles, France, assignors to Pechiney Compagnie de Produits Chimiques et Electrometallurgiques, Paris, and Societe Appareils et Evaporateurs Kestner, Lille, France
Filed Mar. 15, 1968, Ser. No. 713,422
Claims priority, application France, Mar. 20, 1967, 99,394
Int. Cl. C01f 7/02
U.S. Cl. 23—52
9 Claims

ABSTRACT OF THE DISCLOSURE

A process for the continuous attack of ores containing alumina with an aqueous solution of caustic soda and sodium aluminate in which use is made of a series of stages each having an autoclave with the autoclaves increasing in temperature from stage to stage in the direction of flow of the suspension with the autoclave in one stage receiving suspension from the preceding stage and expansion vessels with the expansion vessels decreasing in pressure in countercurrent relation with the autoclaves of increasing temperature.

This invention relates to continuous treatment of bauxite with an aqueous solution of caustic soda and sodium aluminate for the recovery of aluminum oxide and it relates more particularly to a method and apparatus for the practice of same.

Installations for the continuous attack on bauxite with caustic soda are generally based on the same principle with possible modifications depending upon the nature of the bauxite being treated which depends upon the type of ore being worked.

It is an object of this invention to provide a new and improved method and apparatus for use in the extraction of alumina from bauxite or ores containing alumina.

These and other objects and advantages of this invention will hereinafter appear and for purposes of illustration, but not of limitation, embodiments of the invention are shown in the accompanying drawings in which—

Figure 1:
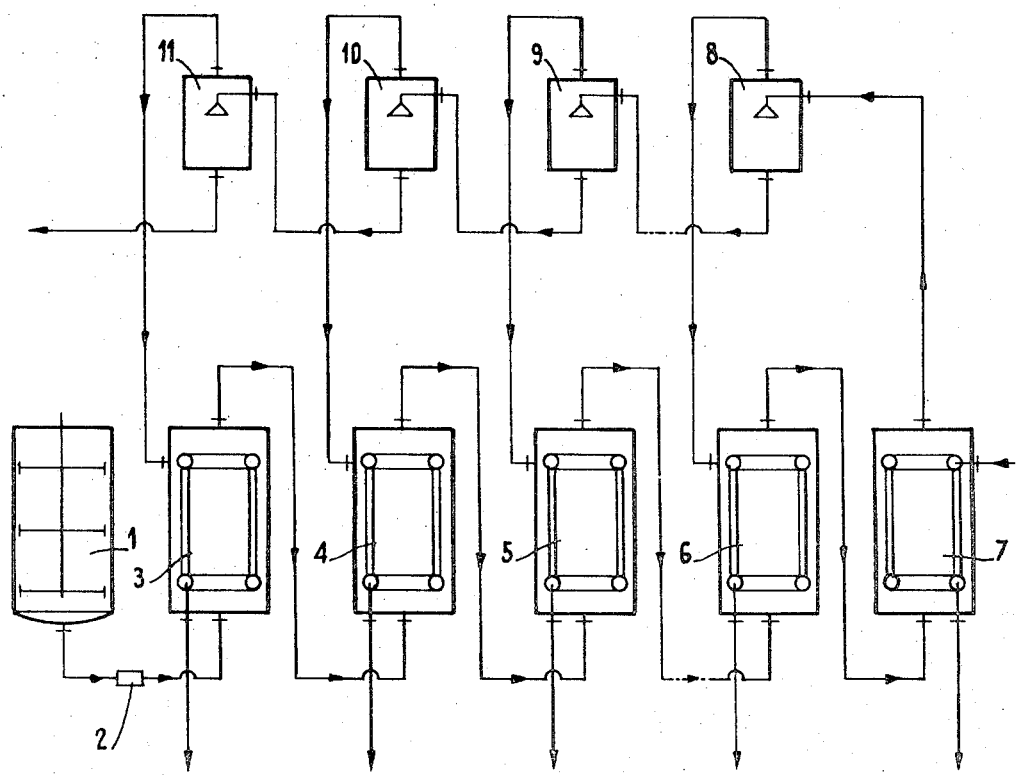
FIG. 1 is a flow diagram illustrative of the present practice for the extraction of alumina from bauxite.

The following is a description of present practice in the treatment of bauxite, as illustrated in FIG. 1. The bauxite, after being crushed, is suspended in the required volume of caustic soda and sodium aluminate solution, which constitutes the attacking solution. A thick solution is formed and maintained, with agitation, in the storage tank for subsequent delivery by pump 2 to a series of heater-type autoclaves 3, 4, 5 and 6, each of which is provided with heating means to raise the temperature of the suspension from one autoclave to the next and live steam is used for introducing the heat in the last of the autoclaves 7. The suspension reaches its maximum temperature in the last autoclave and remains for the time necessary to complete the attack, i.e., the dissolution of alumina contained in the bauxite in the caustic soda solution. An insoluble residue, known as "red muds" remains in suspension and is subsequently separated from the aluminate solution.

From the last autoclave, the suspension, under high pressure and at high temperature, is passed through a series of expansion vessels 8, 9, 10 and 11 wherein expansion is effected in each vessel with the accompanying partial vaporization and reduction in temperature. The vapor liberated in each expansion vessel is used for heating the autoclaves 6, 5, 4 and 3.

Upon leaving the last expansion vessel 11, the suspension is diluted with water and advanced to the installation for separation of the red muds, such as in settling tanks, clarifiers and/or filters and the like. After cooling, the separated clear liquor is advanced to decomposers where it is subjected to a hydrolysis which yields aluminum trihydrate and regenerates the caustic soda.

The described procedure is somewhat common to existing installations for the continuous attack of bauxite for the removal of alumina with a solution of sodium aluminate and caustic soda.

Two main factors are involved in the alkaline attack on the bauxite, namely, the temperature at the end of the attack and the concentration of free caustic soda in solution in the attacking suspension. The speed of attack increases with increased temperature and concentration. When treating bauxites which are attacked with difficulty, such as the monohydrate ores, these two factors are usually increased simultaneously.

In the case of bauxites which are easily attacked, such as trihydrate ores, it is advantageous to work at high temperature, using high pressure resistant equipment. It is then possible to use relatively dilute alkaline solutions which are preferred over very concentrated solutions from the standpoint of corrosion, the efficiency of the exchangers, etc.

Even in the case of bauxites which are attacked with difficulty, it is preferred, when equipment resistant to high pressure is available, to make use of a temperature which is as high as possible and to lower the concentration of the solution to the smallest value compatible with the desired speed of attack.

In existing processes, the suspension of bauxite in the attacking liquor is heated with steam by indirect heat exchange through the walls of a heat exchanger. The chief disadvantage of this method of heating is the deposition of salts (silico-aluminates, titanates, etc.) which form as encrustations on the walls of the exchanger with corresponding decrease in the heat exchange coefficient. It becomes essential periodically to clean the heating surfaces which operation requires long shutdowns of the apparatus thereby to increase the cost of operation.

It is an object of this invention to provide a process and apparatus in which the described disadvantages can be completely avoided by fundamentally modifying the system of exchange between the expansion steam and the alkaline solution. It is particularly applicable to the case where the bauxite is attacked at elevated temperature whereby the concentration factor of the attacking solution plays a secondary role.

The process consists in heating the bauxite suspension in the attacking solution solely by injection of steam directly into a mixing apparatus without interposing exchanger walls. In this arrangement, the harmful encrustations are avoided. The precipitation of insoluble salts occurs within the liquor and such precipitation is practically completed by the time that the alumina has been transformed into sodium aluminate in the last autoclave which is heated by direct injection of live steam.

The apparatus for heating the suspension of bauxite in the attacking liquor comprises a series of stages with each stage having an autoclave reservoir, preferably equipped with an agitation system which may be of conventional construction and with a mixing type reheater. The first stage receives a suspension of crushed bauxite in the alkaline solution of free caustic soda and sodium aluminate. The temperature and the pressure rise from one stage to the next and the attack is continued from one stage to the other to the last stage, where the temperature is at a sufficiently high level to effect substantially complete solution of the soluble alumina of the ore. The mean residence time of the suspension in each of the autoclave reservoirs should be sufficient to attain the solubility equilibrium at the particular temperature existing therein. The time, which is less than one hour, is preferably between 1 to 10 minutes. The suspension of the red muds in the aluminate solution from the last autoclave is passed through a series of exchange expansion vessels with resultant cooling and progressive concentration of the suspension while supplying steam necessary for heating each of the autoclaves in the series.

Figure 2:
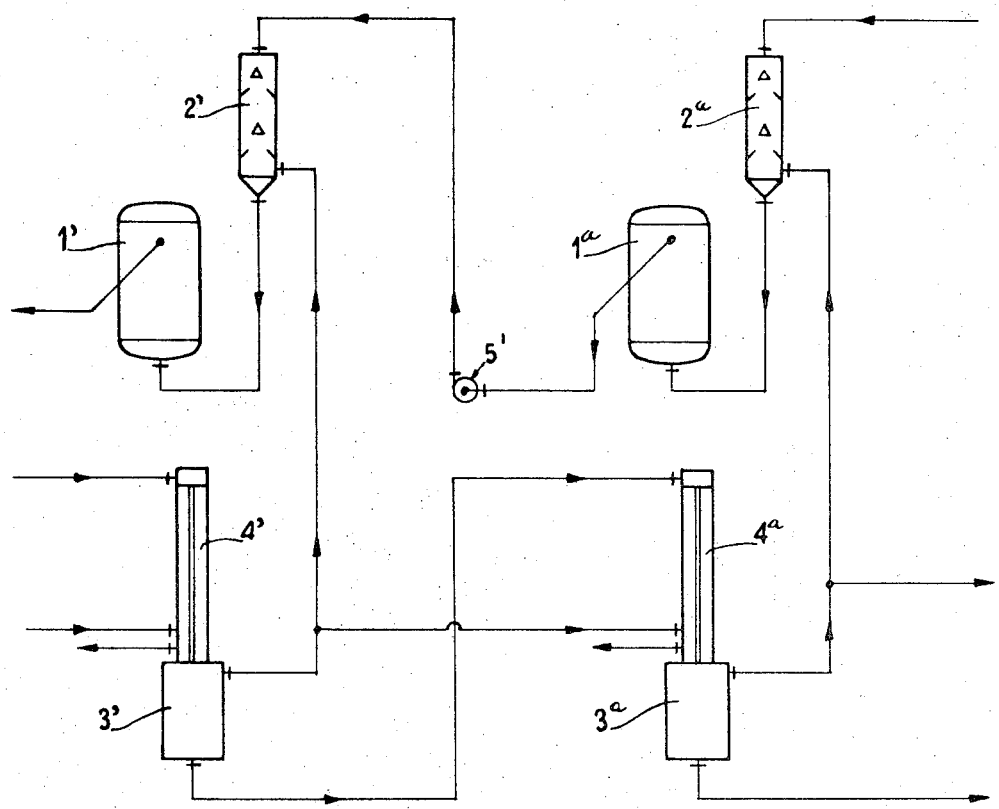
FIG. 2 is a flow diagram of a segment of the extraction process embodying the features of this invention.

Two stages of the series are shown diagrammatically in FIG. 2. In the upper part of FIG. 2 the containers 1$^a$ and 1' are the attacking autoclave reservoirs; 2$^a$ and 2' represent the reheaters in which steam is directly mixed for heating the suspension. A circulation pump 5' transmits the suspension from the autoclave 1$^a$ to the autoclave 1' through the steam mixer 2'.

In the lower part of FIG. 2, there are shown two stages of the series of exchange expansion vessels which are formed of an exchanger 4$^a$ and 4' having a nest of tubes which functions as an evaporator and its receiver 3$^a$ and 3' in which the liquid and steam are separated. The circulation through the series of expansion vessels is effected by the pressure differential between the first expansion vessel, which receives the suspension at high pressure from the last autoclave, and the last expansion vessel which is at about atmospheric pressure. Receiver 3' contains the liquid and the steam from the nest of tubes 4'. The liquid passes through the nest of tubes in the exchange 4$^a$. The pressure supported by the liquid is greater at the inlet to the nest of tubes than at the outlet. An expansion occurs which causes a partial vaporization of the water in the suspension within the tubes of the nest. In addition, the steam leaving the reservoir 3' of the exchanger and expansion vessel of the preceding stage is caused to circulate outside of the tubes of the nest. This steam condenses, thus assuring considerable supplementary vaporization of the solution undergoing the expansion in the nest. Because of this process of simultaneous expansion and exchange, much greater evaporation is obtained than that which would be produced by expansion alone and the suspension of the red muds is concentrated by drawing off water of condensation at the outlet from each of the exchangers.

Although the invention is not characterized by the type of evaporator, which may be of various designs, it is preferred to make use of a combined evaporator and exchanger based on a vertically disposed column having a film of suspension flowing downwardly over the vertical walls. The steam that is formed is entrained at high speed with the liquid which trickles over the internal walls of the nest. The heat coefficient of this arrangement is extremely high, such as 2 or 3 thermal units per square meter, per hour and per degree centigrade, whereas the heat transfer coefficient does not exceed 0.8 to 1 thermal unit with existing reheaters.

The process of the invention permits another extremely important modification in the operation of the apparatus.

By injecting a supplementary quantity of live steam into the jacket or casing of one of the first stages, and by drawing off a corresponding quantity of steam from one of the last stages, the amount of vaporization of the solution can be increased. The produced vapor is passed into the following evaporator thereby to make it possible to concentrate the aluminate solution still further. The advantages of this process are numerous, namely: reduction of the reaction volume with corresponding reduction in the size of equipment; reduction of the volume of departing liquors with corresponding savings in heat loss in the discharged liquors. By increasing the evaporation sufficiently during the attacking operation, it is possible to omit the separate installations of evaporators which are employed in present day alumina facilities.

The arrangement shown in FIG. 2 is capable of numerous modifications. An industrial installation embodying the principles described above can be incorporated in an arrangement of the type shown in FIG. 3. The horizontal cylinder is divided into two chambers by a vertical partitioning wall which has an opening at its upper end to permit the passage of vapors. It combines in a single apparatus the attacking autoclave 1$^b$ and the reservoir 3$^b$ of the heat exchanger which functions as an evaporator. The steam mixer 2$^b$ and the exchanger nest of tubes 4$^b$ are placed directly at the upper part of the cylinder and communicating respectively with the chambers 1$^b$ and 3$^b$ of this cylinder. This arrangement greatly simplifies the connecting piping and reduces the heat losses.

Figure 3:
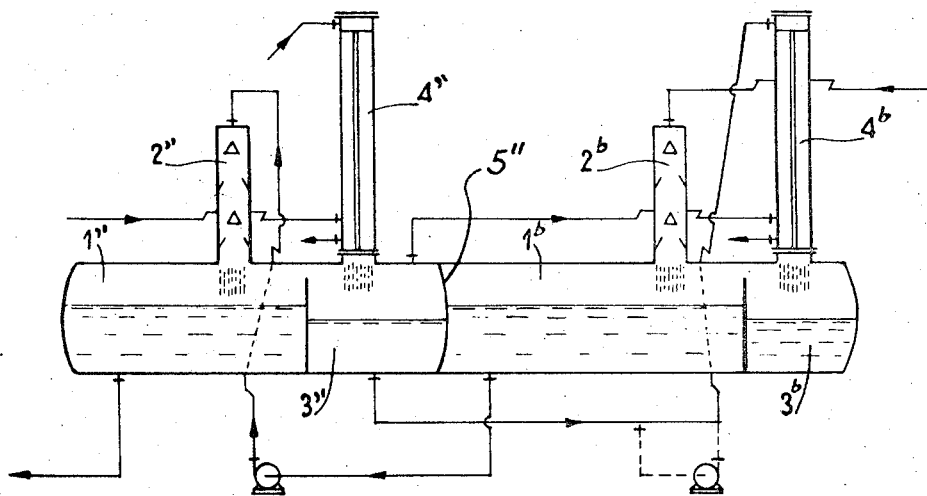
FIG. 3 is a flow diagram showing a modification of the apparatus in FIG. 2.

It is even possible for several successive stages to be combined in a single cylinder which is divided internally into complete sections as by means of a sealing partition 5''. FIG. 3 shows two stages grouped in a single cylinder in which the elements 1'', 2'', 3'' and 4'' correspond to elements 1$^b$, 2$^b$, 3$^b$ and 4$^b$ previously described.

What is claimed is:

1. In a process for the continuous attack on ores containing alumina with aqueous solution of caustic soda and sodium aluminate wherein a suspension of ore in the aqueous solution is passed through a series of stages of autoclaves at increasing temperatures with the suspension entering the last stage being at a temperature close to its boiling point and wherein the suspension is passed through a series of stages of evaporative expansion zones of decreasing pressure, the improvement comprising the steps of heating the suspension entering each autoclave in a heating zone by direct fluid-fluid contact with steam, passing the resulting heated suspension through a series of autoclaves in which the resulting heated suspension in each autoclave is in contact with the walls of the autoclave at a temperature no higher than the temperature of the suspension, the residence time of the suspension in each autoclave being sufficient to permit the suspension to reach thermal equilibrium therein whereby alumina from the ore is dissolved and complex salts in the ore are precipitated, continuously removing the suspension from each autoclave for passage to the successive autoclave and passing the suspension from the last autoclave through a series of thin film evaporative expansion zones of decreasing pressure to concentrate the suspension and to generate steam and passing the steam thus generated in each of the evaporative expansion zones to each heating zone to heat the suspension entering each autoclave by direct fluid for contact therewith.

2. The process as claimed in claim 1 in which the treated ore is bauxite.

3. The process as claimed in claim 1 in which the suspension is retained in each stage for less than one hour.

4. The process as claimed in claim 1 in which the suspension is retained in each stage for 1 to 10 minutes.

5. The process as claimed in claim 1 in which the expansion zones include vertically disposed coils whereby the suspension flows downwardly as a thin film over the surfaces of the coils.

6. The process as claimed in claim 5 in which the generated steam entrains liquid on the walls of the coils.

7. The process as claimed in claim 1 which includes the step of introducing a quantity of live steam into one of the latter stages to evaporate a part of the water from the suspension entering the stage and charging the steam generated into an expansion vessel of the preceding stage.

8. The process as claimed in claim 1 in which each stage is formed of a single cylinder disposed upon a horizontal axis and separated into two chambers which communicate through an opening in the upper portion of the partition wall, one of the chambers forming the autoclave above which is disposed the steam mixer supplied with suspension from the previous stage, the other chamber forming an autoclave over which the coils of the expansion vessel are arranged and supplied with steam and liquid from the following stage at higher temperature.

9. The process as claimed in claim 8 in which several stages are grouped in a single horizontally disposed cylindrical housing.

References Cited

UNITED STATES PATENTS

| | | | |
|---|---|---|---|
| 2,701,751 | 2/1955 | Porter | 23—143 |
| 2,701,752 | 2/1955 | Porter | 23—143 |
| 2,852,343 | 9/1958 | Scandrett et al. | 23—143 |
| 2,946,658 | 7/1960 | Donaldson | 23—143 |
| 3,095,280 | 6/1963 | Soudan et al. | 23—143X |
| 3,241,910 | 3/1966 | Johnson | 23—52 |
| 3,413,087 | 11/1968 | Roberts | 23—143 |

HERBERT T. CARTER, Primary Examiner

U.S. Cl. X.R.

23—143, 267